US010796314B2

(12) United States Patent
Miyagi

(10) Patent No.: US 10,796,314 B2
(45) Date of Patent: Oct. 6, 2020

(54) COMMODITY RETURN PROCESSING DEVICE

(71) Applicant: TOSHIBA TEC KABUSHIKI KAISHA, Tokyo (JP)

(72) Inventor: Daisuke Miyagi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 16/151,578

(22) Filed: Oct. 4, 2018

(65) Prior Publication Data

US 2019/0108526 A1    Apr. 11, 2019

(30) Foreign Application Priority Data

Oct. 5, 2017  (JP) .................. 2017-195500

(51) Int. Cl.
 *G06Q 20/20* (2012.01)
 *G06Q 20/40* (2012.01)
 *G06Q 20/38* (2012.01)
(52) U.S. Cl.
 CPC ......... *G06Q 20/407* (2013.01); *G06Q 20/202* (2013.01); *G06Q 20/208* (2013.01); *G06Q 20/209* (2013.01); *G06Q 20/389* (2013.01)
(58) Field of Classification Search
 None
 See application file for complete search history.

(56) References Cited

U.S. PATENT DOCUMENTS

| | | | |
|---|---|---|---|
| 9,911,107 B2 * | 3/2018 | Li ......................... | G06Q 30/06 |
| 10,185,943 B2 * | 1/2019 | Clark ................. | G06K 7/10722 |
| 2001/0037207 A1 * | 11/2001 | Dejaeger ................ | G06Q 20/10 |
| | | | 705/39 |
| 2013/0085889 A1 * | 4/2013 | Fitting .................. | G06Q 10/087 |
| | | | 705/26.35 |
| 2014/0006199 A1 * | 1/2014 | Grigg ..................... | G06Q 30/06 |
| | | | 705/26.1 |
| 2014/0316919 A1 * | 10/2014 | Li .......................... | G06Q 30/06 |
| | | | 705/23 |
| 2016/0350757 A1 * | 12/2016 | Bolling ................ | G06Q 20/407 |
| 2017/0039572 A1 * | 2/2017 | Hammond ........... | G06Q 10/087 |
| 2018/0096298 A1 * | 4/2018 | Twizeyimana ..... | G06Q 10/0837 |
| 2018/0114228 A1 * | 4/2018 | Singh ................. | G06K 9/00335 |
| 2019/0244214 A1 * | 8/2019 | Flores ................. | G06Q 20/407 |

FOREIGN PATENT DOCUMENTS

JP         2010-113540 A        5/2010

* cited by examiner

*Primary Examiner* — Christle I Marshall
(74) *Attorney, Agent, or Firm* — Kim & Stewart LLP

(57) ABSTRACT

A commodity return processing device is configured to communicate with a point-of-sale (POS) server, and includes a display, scanner, an input device, and a processor. The processor is configured to control the scanner to read a customer ID that identifies a customer, control the display to show a list of transactions made by the identified customer, determine a commodity to be returned included in one of the transactions in response to a selection made by the customer via the input device, retrieve from the POS server information about one or more requirements for accepting a return of the commodity using a commodity code assigned to the commodity, determine whether the requirements are met based on at least one of a condition of the commodity and the current date, and perform a refund process for the commodity if the requirements are met.

18 Claims, 2 Drawing Sheets

COMMODITY RETURN PROCESSING DEVICE

CROSS-REFERENCE TO RELATED APPLICATION

This application is based upon and claims the benefit of priority from Japanese Patent Application No. 2017-195500, filed in Oct. 5, 2017, the entire contents of which are incorporated herein by reference.

FIELD

Embodiments described herein relate generally to a commodity return processing device that is configured to process commodity returns more efficiently and with less errors.

BACKGROUND

Various proposals have been made for processing refund on returned commodities automatically. However, such conventional schemes still require a store clerk to inspect the returned commodity and process the refund manually, which puts a heavy burden on the store clerk. Thus, there is a need for a new technique that can reduce the workload of the store clerk caused by the conventional refund scheme.

DETAILED DESCRIPTION

In accordance with an embodiment, a commodity return processing device is configured to communicate with a point-of-sale (POS) server, and includes a display, scanner, an input device, and a processor. The processor is configured to control the scanner to read a customer ID that identifies a customer, control the display to show a list of transactions made by the identified customer, determine a commodity to be returned included in one of the transactions in response to a selection made by the customer via the input device, retrieve from the POS server information about one or more requirements for accepting a return of the commodity using a commodity code assigned to the commodity, determine whether the requirements are met based on at least one of a condition of the commodity and the current date, and perform a refund process for the commodity if the requirements are met.

Hereinafter, an embodiment of the invention is described with reference to the drawings. In an embodiment, a Point-Of-Sale (POS) system including a commodity return reception apparatus and a POS server is described as an example.

Figure 1:
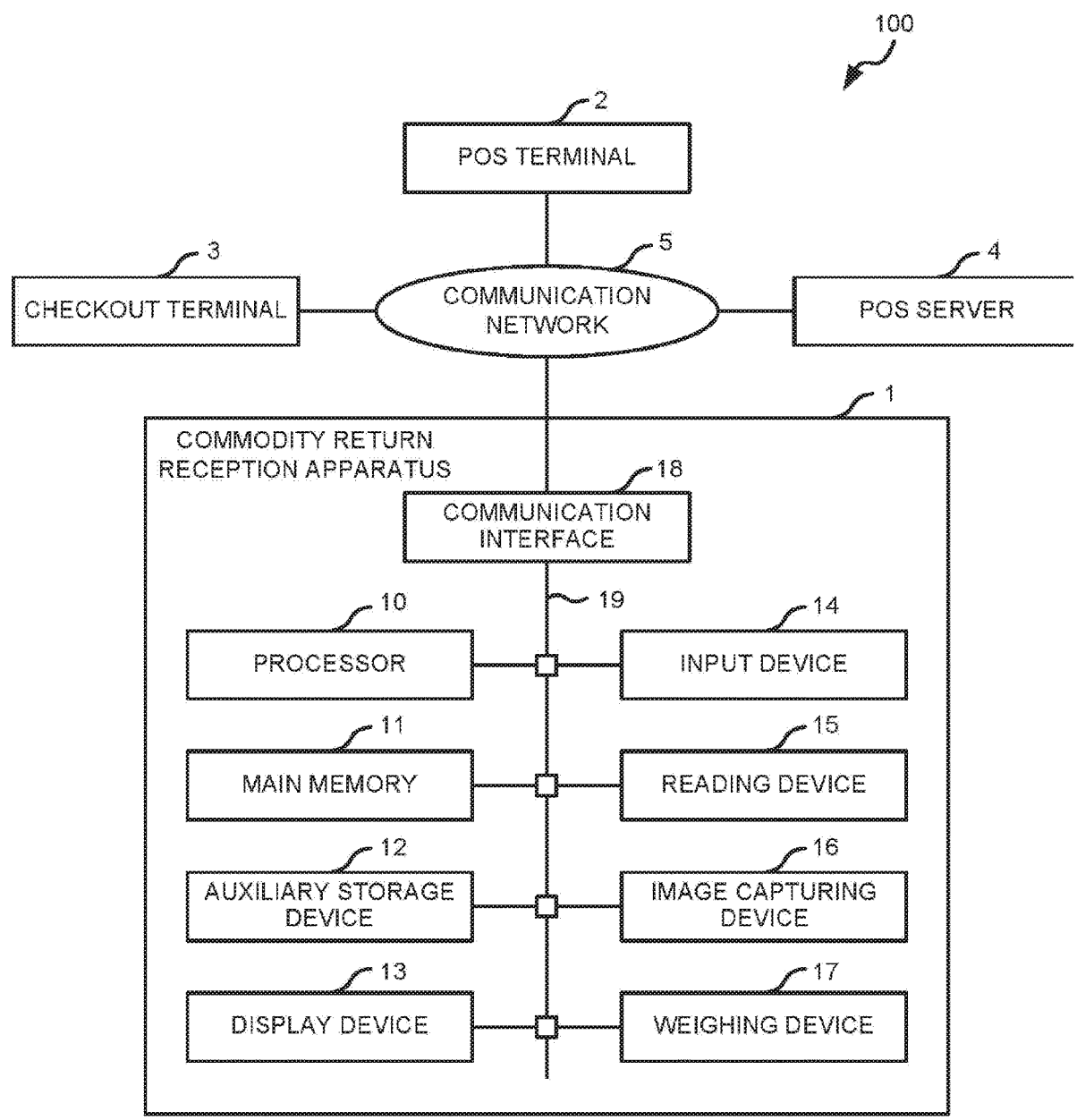
FIG. 1 is a block diagram illustrating a schematic configuration of a POS system and a circuit configuration of main portions of a commodity return reception apparatus according to an embodiment.

FIG. 1 is a block diagram illustrating a schematic configuration of main portions of a POS system 100 and a circuit configuration of main portions of a commodity return reception apparatus 1 according to an embodiment.

The POS system 100 is constituted in such a manner that the commodity return reception apparatus 1, a POS terminal 2, a checkout terminal 3 and a POS server 4 can communicate with each other via a communication network 5. The communication network 5 can use the Internet, a Virtual Private Network (VPN), a Local Area Network (LAN), a public communication network, a mobile communication network, a leased line, etc. singly or in appropriately combined manner. Typically, the POS system 100 includes a plurality of the POS terminals 2 and a plurality of the checkout terminals 3, but in FIG. 1, only one POS terminal 2 and one checkout terminal 3 are shown. A plurality of the commodity return reception apparatuses 1 may be provided in the POS system 100 in some cases.

The commodity return reception apparatus 1, the POS terminal 2 and the checkout terminal 3 are all installed within an area where a customer is permitted to enter freely in a retail store. The commodity return reception apparatus 1, the POS terminal 2 and the checkout terminal 3 may be arranged at any location for each retail store. In an embodiment, the POS terminal 2 and the checkout terminal 3 are arranged in an area defined as a checkout center, and the commodity return reception apparatus 1 is installed in an area defined as a commodity return center.

The POS terminal 2 performs a registration processing for registering a content of a transaction such as sales of commodities in a retail store. The POS terminal 2 transmits checkout data for checkout of a payment amount of the transaction registered by the registration processing to the checkout terminal 3. The POS terminal 2 may be provided with a function for performing a checkout processing for checkout of the above payment amount. The checkout processing includes a calculation processing for calculating the payment amount and a settlement processing for settlement of the payment amount. However, the POS terminal 2 may perform only the calculation processing.

The checkout terminal 3 performs the calculation processing and the settlement processing based on the checkout data. If the POS terminal 2 performs the calculation processing, the checkout terminal 3 may perform only the settlement processing contained in the checkout processing. The checkout terminal 3 also carries out a refund processing to refund the payment amount in response to the return of the commodity.

The POS server 4 manages a history of the transaction based on the registration processing and checkout processing performed by the POS terminal 2 and the checkout terminal 3. Specifically, the POS server 4 generates and stores transaction history data indicating details of the transaction registered in the registration processing, a checkout result in the checkout processing, and the like.

The commodity return reception apparatus 1 includes a processor 10, a main memory 11, an auxiliary storage device 12, a display device 13, an input device 14, a reading device 15, an image capturing device 16, a weighing device 17, a communication interface 18 and a transmission path 19.

The processor 10, the main memory 11 and the auxiliary storage device 12 are connected with each other through the transmission path 19 to constitute a computer for performing an information processing for controlling the commodity return reception apparatus 1.

The processor 10 acts as a central part of the computer. The processor 10 controls each section to realize functions of the commodity return reception apparatus 1 by executing an operating system and an application program.

The main memory 11 includes a non-volatile memory area and a volatile memory area. The main memory 11 stores the operating system and the application program in the non-volatile memory area. The main memory 11 stores data necessary for the processor 10 to execute a processing for controlling each section in the non-volatile or volatile memory area in some cases. The main memory 11 uses the volatile memory area as a work area where data is appropriately rewritten by the processor 10.

The auxiliary storage device 12 acts as an auxiliary storage section of the computer. The auxiliary storage device 12 is, for example, an Electric Erasable Programmable Read-Only Memory (EEPROM). The auxiliary storage device 12 may be a Hard Disk Drive (HDD), a Solid State Drive (SSD), or any other well-known storage device. The auxiliary storage device 12 stores data used for the processor 10 to execute various processing and data generated in the processing by the processor 10. The auxiliary storage device 12 stores the application program in some cases.

The display device 13 displays various screens for notifying an operator of various information. As the display device 13, for example, a well-known device such as a liquid crystal display device can be used.

The operator inputs various instructions through the input device 14. As the input device 14, well-known devices such as a touch sensor or a keyboard can be used singly or in a combined manner.

The reading device 15 reads data stored or displayed in a recording medium. As the reading device 15, well-known devices such as a barcode scanner or a card reader can be used singly or in a combined manner.

The image capturing device 16 photographs a commodity and outputs image data relating to an appearance of the commodity. As the image capturing device 16, a well-known device such as a video camera can be used.

The weighing device 17 measures the weight of the commodity and outputs weight data. As the weighing device 17, for example, a well-known device such as a digital weight meter or weight scale can be used.

The communication interface 18 performs data communication via the communication network 5. As the communication interface 18, for example, a well-known device which performs a well-known processing for data communication via the Internet can be used.

The transmission path 19 includes an address bus, a data bus, a control signal line, and the like, and transmits data and control signals transmitted and received to and from the connected sections.

Next, the operation of the commodity return reception apparatus 1 is mainly described in the description of the operation of the POS system 100 configured as described above.

A customer who purchases a commodity in a retail store where the POS system 100 is installed uses the POS terminal 2 to register a purchased commodity and then uses the POS terminal 2 or the checkout terminal 3 to perform a checkout operation on the payment amount of the commodity. The operations of the POS terminal 2 and the checkout terminal 3 may be performed by either a store clerk or the customer. Then, the POS server 4 generates and stores transaction history data indicating details of the transaction registered in the registration processing, a checkout result in the checkout processing, and the like. If the customer is registered as a member, a member code is input using the input device 14 or the reading device 15 when the commodity is registered. In this case, the above transaction history data includes the above member code.

When a customer who is a member wants to return a commodity that has already been settled, the customer can enters the retail store and perform procedures for returning the commodity with the commodity return reception apparatus 1.

When the commodity return reception apparatus 1 is in an operation state for receiving the returned commodity, the processor 10 executes various information processing as described below by executing the application program stored in the main memory 11 or the auxiliary storage device 12. The contents of the processing described below are merely an example, and various processing capable of achieving the same result can be appropriately used.

Figure 2:
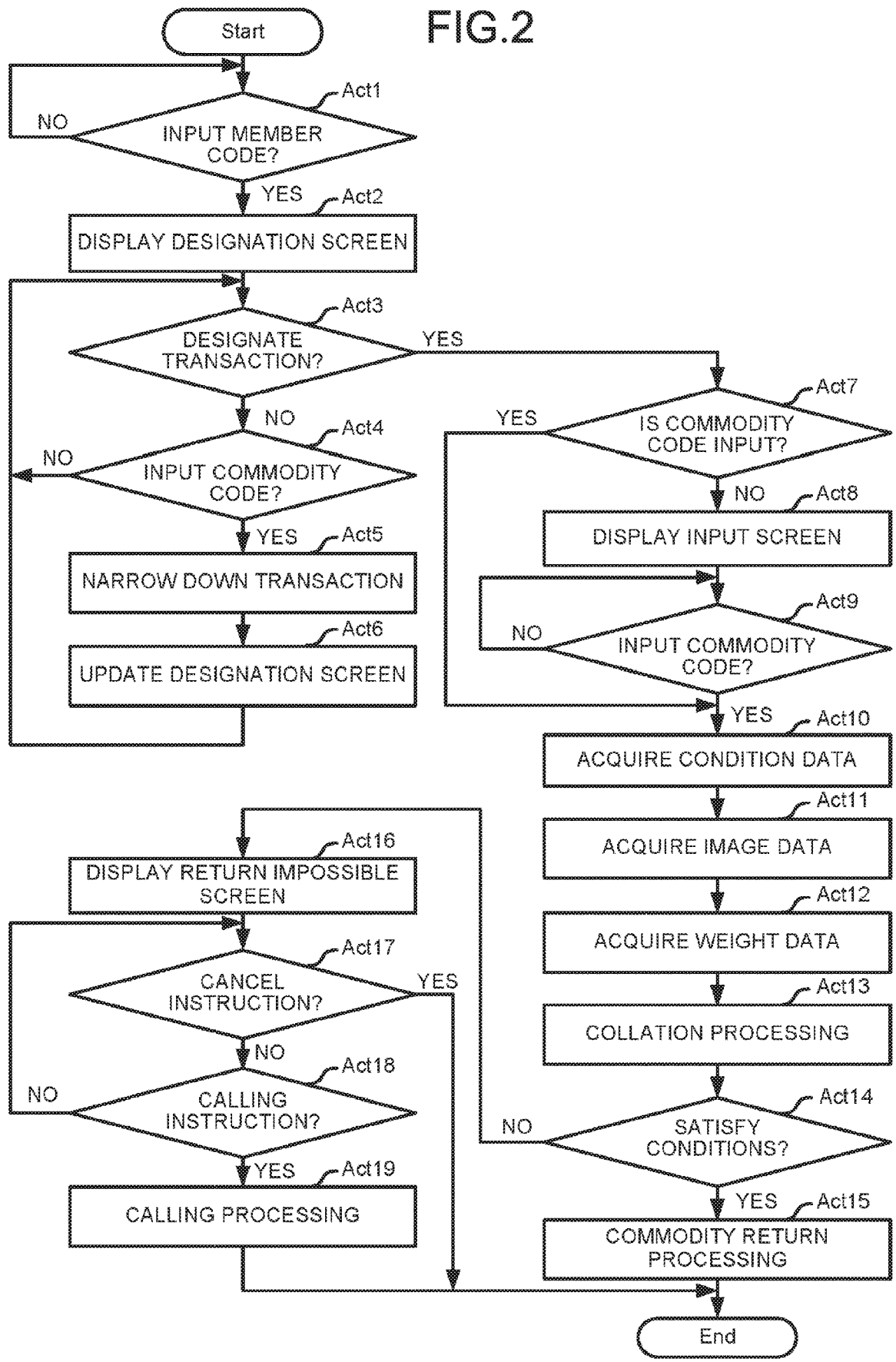
FIG. 2 is a flowchart depicting a flow of an information processing by a processor shown in FIG. 1.

FIG. 2 is a flowchart depicting a flow of the information processing by the processor 10.

In Act 1, the processor 10 stands by until the member code is input.

For example, the customer inputs the member code to the commodity return reception apparatus 1 by using the reading device 15 to read a barcode displayed on an information terminal carried by himself/herself or by using the reading device 15 to read a member code recorded in a member card. By doing this, the processor 10 determines Yes in Act 1 and proceeds to the processing in Act 2.

In Act 2, the processor 10 displays a designation screen on the display device 13. The designation screen is used for the customer to designate a transaction which is target for return. For example, the processor 10 acquires the transaction history data including the input member code described above from the POS server 4. Then, the processor 10 generates the designation screen as a screen forming a Graphical User Interface (GUI) for specifying the target transaction from a catalog of the acquired transaction history data, and displays the designation screen on the display device 13.

In Act 3, the processor 10 confirms whether or not a transaction is designated. Then, if the transaction is not designated, the processor 10 determines No and proceeds to the processing in Act 4.

In Act 4, the processor 10 confirms whether or not the commodity code is input. Then, if the commodity code is not input, the processor 10 determines No and returns to the processing in Act 3.

Thus, the processor 10 stands by until the transaction is designated or the commodity code is input in Act 3 or Act 4.

The customer confirms the designation screen to designate the transaction containing a purchased commodity to be returned (hereinafter, referred to as a target commodity). If there are a large number of transactions and it is impossible to decide which one of the transactions shown on the designation screen the corresponding transaction is, the customer inputs a commodity code of the target commodity prior to the designation of the transaction. Specifically, for example, the customer inputs the commodity code to the commodity return reception apparatus 1 by using the reading device 15 to read a barcode of the target commodity. By doing this, the processor 10 determines Yes in Act 4 and proceeds to the processing in Act 5. At this time, the processor 10 stores the input commodity code in the auxiliary storage device 12.

In Act 5, the processor 10 narrows down the transaction history data acquired from the POS server 4 to the transaction history data including the input commodity code.

In Act 6, the processor 10 updates the designation screen with a screen showing a list in the narrowed-down transaction history data. After that, the processor 10 returns to the standby state in Act 3 and Act 4.

If the customer performs an operation to designate a transaction with the input device 14, the processor 10 determines Yes in Act 3 and proceeds to the processing in Act 7. The transaction designated here is hereinafter referred to as the target transaction.

In Act 7, the processor 10 confirms whether or not the commodity code is input. Then, if the commodity code is not input in the standby state in Act 3 and Act 4, the processor 10 determines No and proceeds to the processing in Act 8.

In Act 8, the processor 10 display an input screen on the display device 13. The input screen is used for guiding a customer to input the commodity code of the target commodity.

In Act 9, the processor 10 stands by until the commodity code of the target commodity is input. The customer inputs the commodity code of the target commodity according to the guidance on the input screen. Then, the processor 10 determines Yes in Act 9, and proceeds to the processing in Act 10. At this time, the processor 10 stores the input commodity code in the auxiliary storage device 12. If the commodity code is input in the standby state in Act 3 and Act 4, the processor 10 determines Yes in Act 7, omits the processing in Act 8 and Act 9, and proceeds to the processing in Act 10.

In Act 10, the processor 10 acquires condition data. The condition data indicates one or more conditions or requirements for permitting return of a commodity. The condition data is stored in the POS server 4, for example. However, the condition data may be stored in another server device rather than the POS server 4, or may be stored in the auxiliary storage device 12. The condition indicated by the condition data at least includes a condition related to a state of the commodity, such as "Package is not opened" and "Weight is within a prescribed range". The condition indicated by the condition data may also include conditions which do not relate to the state of the commodity, such as "Within a commodity return reception period prescribed in the retail store" and "Within the returnable period set for the commodity". The condition data may be different or common for each commodity. The individual condition data and common condition data may be mixed for each commodity. The processor 10 acquires the condition data corresponding to the commodity code stored in the auxiliary storage device 12.

After the customer finishes inputting the commodity code, the customer puts the target commodity at a predetermined place.

In Act 11, the processor 10 acquires the image data of the target commodity. Specifically, the processor 10 acquires image data obtained by photographing the target commodity placed in the predetermined place by the image capturing device 16 and output from the image capturing device 16. The processor 10 stores the acquired image data in the auxiliary storage device 12. At this time, the image capturing device 16 preferably photographs the target commodity from plural directions. A well-known method can be used for photographing the target commodity.

In Act 12, the processor 10 acquires the weight data of the commodity to be returned. Specifically, the processor 10 acquires the weight data obtained by weighing the target commodity placed in the predetermined place with the weighing device 17 and output from the weighing device 17. The processor 10 stores the acquired weight data in the auxiliary storage device 12.

In Act 13, the processor 10 executes a collation processing. The collation processing is used for confirming whether the target commodity satisfies each of the conditions indicated by the acquired condition data. Some specific examples of the processing by the processor 10 here are listed below.

(1) A case in which the acquired condition data indicates a condition that "Within the commodity return reception period prescribed in the retail store".

The processor 10 determines the commodity return reception period of the target commodity as a period until a predetermined number of days elapses in the retail store from transaction date and time indicated by the transaction history data relating to the target transaction. Then, if the current time point is within the commodity return reception period, the processor 10 determines that the condition "Within the commodity return reception period prescribed in the retail store" is satisfied.

(2) A case in which the acquired condition data indicates a condition that "Within the returnable period set for the commodity".

The processor 10 determines a returnable period of the target commodity as a period until a predetermined number of days elapses relating to target commodity from the transaction date and time indicated by the transaction history data of the target transaction. Then, if the current time point is within the returnable period, the processor 10 determines that the condition "Within the returnable period set for the commodity" is satisfied.

(3) A case in which the acquired condition data indicates the condition "Package is not opened".

The processor 10 determines whether or not the image data acquired in Act 11 includes a feature indicating that the package is opened. Then, if the corresponding feature is not included, the processor 10 determines that the condition "Package is not opened" is satisfied. To achieve this, the processor 10 compares the feature data extracted from the acquired image data with reference data that represents feature data of an unopened package image, and determines that the package is not opened when the similarity of these data exceeds a certain threshold.

(4) A case in which the acquired condition data indicates a condition that "Weight is within a prescribed range".

The processor 10 determines whether or not the weight indicated by the weight data acquired in Act 12 is within a predetermined range for the target commodity. Then, if the weight is within the range, the processor 10 determines that the condition "Weight is within the prescribed range" is satisfied.

Thus, by executing the information processing shown in FIG. 2 by the processor 10, the computer having the processor 10 determines that the state of the commodity satisfies the condition for permitting the return of the commodity.

In Act 14, the processor 10 confirms whether or not all of the conditions indicated by each of the condition data acquired in Act 10 are satisfied. Then, if the conditions are satisfied, the processor 10 determines Yes and proceeds to the processing in Act 15.

In Act 15, the processor 10 executes a commodity return processing. The commodity return processing is a processing for returning the target commodity. The processor 10 generates commodity return data including, for example, a transaction code for identifying the target transaction and the commodity code of the target commodity. The processor 10 sends out the commodity return data from the communication interface 18 to the POS server 4 through the communication network 5. The processor 10 generates refund data including a command instructing execution of a processing for refund and data which indicates a settlement amount of the target commodity and a settlement method. The processor 10 sends out the refund data from the communication interface 18 to the checkout terminal 3 through the communication network 5. The generation and transmission of the refund data is an example of predetermined control processing for refunding the payment amount of the commodity. By executing the information processing shown in FIG. 2 by the processor 10, the computer having the processor 10 performs the above-described control processing.

If the commodity return data is received, the POS server 4 updates the transaction history data so as to reflect the reception. Alternatively, the POS server 4 may update the commodity return data with a commodity return history data different from the transaction history data.

If the refund data is received, the checkout terminal 3 performs a processing for refunding the amount shown therein in a manner in response to the settlement method indicated therein. For example, if the settlement method is settlement by cash, the checkout terminal 3 refunds the cash corresponding to the amount indicated in the refund data. For example, if the settlement method is settlement by credit, the checkout terminal 3 carries out a well-known processing for cancellation after reading the credit card.

If a plurality of the checkout terminals 3 is included in the POS system 100, the processor 10 selects one of them according to a predetermined rule. Then, the processor 10 sends out the refund data to the selected checkout terminal 3. Alternatively, the processor 10 may send out the refund data without designating the checkout terminal 3 which receives the refund data. In this case, one of the plurality of the checkout terminals 3 receives the refund data according to a predetermined rule.

The target commodity may be collected by any method. For example, the target commodity is put in a collection box installed at the commodity return center. Alternatively, a mechanism for conveying the target commodity placed in the above-mentioned predetermined place to the collection box may be provided to perform collection automatically.

Then, if the commodity return processing as described above is completed, the processor 10 terminates the information processing shown in FIG. 2. After the information processing shown in FIG. 2 is terminated temporarily, the processor 10 starts the information processing again.

By the way, if the processor 10 determines that any one of the conditions indicated in the condition data acquired in the Act 10 is not satisfied by the collation processing in the Act 13, the processor 10 determines No in the Act 14 and proceeds to the processing in Act 16.

In Act 16, the processor 10 displays a return impossible screen on the display device 13. The return impossible screen is a predetermined screen for notifying the customer that the target commodity cannot be returned.

In Act 17, the processor 10 confirms whether or not an instruction to cancel the return of the target commodity is issued. Then, if the corresponding instruction is not issued, the processor 10 determines No, and proceeds to the processing in Act 18.

In Act 18, the processor 10 confirms whether or not a calling of a store clerk is instructed. Then, if the corresponding instruction is not issued, the processor 10 determines No and returns to the processing in Act 17.

In this way, the processor 10 stands by until a cancel instruction or a calling instruction in Act 17 or Act 18 is issued. Then, if the calling of a store clerk is instructed by a predetermined operation such as touching a calling button shown on the return impossible screen, the processor 10 determines Yes in Act 18 and proceeds to the processing in Act 19.

In Act 19, the processor 10 executes a calling processing. The calling processing is a processing for calling a store clerk to the commodity return reception apparatus 1. For example, the calling processing is a processing of requesting a notification for a terminal apparatus used by a store clerk who is in charge of a commodity return center. The terminal device is the POS terminal 2, the checkout terminal 3, an attendant terminal, a mobile information terminal, or the like. The attendant terminal and the mobile information terminal are not shown in FIG. 1. The attendant terminal is an information processing terminal installed at or near the commodity return center and is operated by the store clerk. The portable information terminal is an information processing terminal such as a smartphone or a handy terminal carried by the store clerk. The calling processing may be a processing of enabling a ringing device to ring or enabling a light emitting device to emit light in the commodity return reception apparatus 1. The processor 10 may execute a plurality of types of processing in parallel or chronologically. Upon completion of the calling processing, the processor 10 terminates the information processing shown in FIG. 2. By executing the information processing shown in FIG. 2 by the processor 10, the computer having the processor 10 performs the above calling processing.

If cancellation is instructed by a predetermined operation such as touching a cancel button shown on the return impossible screen, the processor 10 determines Yes in Act 17 and terminates the information processing shown in FIG. 2 without executing the processing in Act 18 and Act 19.

As described above, according to the commodity return reception apparatus 1, basically it is possible to receive the returned commodity without involving a store clerk. In this way, it is possible to reduce the labor of the store clerk who is involved in receiving the returned commodity.

According to the commodity return reception apparatus 1, the commodity return processing is performed when the state of the commodity such as appearance and weight relating to the commodity to be returned satisfies predetermined conditions. Therefore, even if the store clerk does not confirm the state of the commodity, it is possible to prevent the commodity which is not suitable for return from being returned.

According to the commodity return reception apparatus 1, if it can be determined that the commodity is not suitable for return, the instruction from a customer for calling a store clerk is received. Thereby, if the procedures of the commodity return can be completed without involving a store clerk, it is possible to prevent the store clerk from being called unnecessarily. For example, if the commodity is not suitable for return due to circumstances of the store side such as if the commodity is damaged at the time of purchase, the customer can consult with the called store clerk to continue the procedures for return.

According to the commodity return reception apparatus 1, it is determined whether or not a condition irrelevant to the state of the commodity, such as whether or not it is within a period in which the commodity return is permitted is satisfied. Thus, even if it is determined that the state of the commodity is suitable for return, it is possible to refuse the returned commodity that should not be received due to a rule in each retail store.

The aforementioned embodiments can be modified as follows.

A function of performing the refund processing may be provided in the commodity return reception apparatus 1.

At any time, an instruction of calling the store clerk may be received. The function of calling the store clerk may be omitted.

Only either one of the appearance and the weight may be confirmed in the confirmation of the state of the commodity.

Instead of or in addition to either the appearance or the weight, the state of the commodity may be confirmed based on a measurement result by another measuring device. As another measuring device, various well-known devices such as a temperature sensor, a hardness meter or an odor analyzing device can be used.

The returned commodity may be handled by any method, such as putting the returned commodity back to a display place by the customer.

A part or all of the functions realized by the processor 10 performing the information processing can be realized by hardware which executes the information processing not based on a program such as a logic circuit or the like. Each of the above-described functions may also be realized by combining software control with hardware such as the above logic circuit.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity return processing device configured to communicate with a point-of-sale (POS) server, comprising:
   a display;
   a scanner;
   a network interface;
   an imaging device;
   a scale;
   an input device; and
   a processor configured to:
      control the scanner to read a customer ID that identifies a customer;
      control the display to show a list of transactions made by the identified customer;
      determine a commodity to be returned included in one of the transactions in response to a selection made by the customer via the input device;
      retrieve, from the POS server via the network interface, information about a plurality of requirements for accepting a return of the commodity using a commodity code assigned to the commodity, the requirements including:
         a first requirement that requires the commodity remain unopened, and
         a second requirement that requires a weight of the commodity fall within a range predetermined for the commodity;
      control the imaging device to capture an image of the commodity;
      control the scale to measure the weight of the commodity;
      determine whether each of the first and second requirements is met based on the captured image and the measured weight; and
      determine to initiate a refund process for the commodity if both the first and second requirements are met, and to not initiate the refund process if one of the first and second requirements is not met.

2. The device according to claim 1, wherein
the processor controls the display to show a screen that notifies the customer that the return of the commodity is not allowed when one of the first and second requirements is not met.

3. The device according to claim 2, wherein
the processor is configured to perform a predetermined calling process for calling a store clerk in response to an input made by the customer on the screen.

4. The device according to claim 3, wherein
the processor controls the network interface to transmit a notification to a terminal operated by the store clerk when performing the predetermined calling process.

5. The device according to claim 1, wherein
the requirements include a third requirement that requires the current date fall within a first period that allows the commodity to be returned and that is set by a retail store, and
the processor is further configured to
   acquire a current date,
   determine whether the third requirement is met based on the acquired current date, and
   determine to initiate the refund process for the commodity if all of the first, second, and third requirements are met, and to not initiate the refund process if one of the first, second, and third requirements is not met.

6. The device according to claim 5, wherein
the requirements include a fourth requirement that requires the current date fall within a second period that allows the commodity to be returned and that is set for the commodity, and
the processor is further configured to
   determine whether the fourth requirement is met based the acquired current date, and
   determine to initiate the refund process for the commodity if all of the first, second, third, and fourth requirements are met, and to not initiate the refund process if one of the first, second, third, and fourth requirements is not met.

7. The device according to claim 1, wherein
the processor is configured to:
   control the scanner to read the commodity code of the commodity presented by the customer; and
   retrieve the requirements from the POS server using the commodity code read by the scanner.

8. The device according to claim 1, wherein
the processor is configured to update transaction data stored in the POS server when the refund process is performed.

9. The device according to claim 1, wherein the processor is further configured to, during the refund process, control the network interface to transmit an amount of refund to a checkout terminal via a network connected to the POS server.

10. A method carried out by a commodity return processing device configured to communicate with a point-of-sale (POS) server, the method comprising:
   reading with a scanner a customer ID that identifies a customer;
   showing on a display a list of transactions made by the identified customer;
   determining a commodity to be returned included in one of the transactions in response to a selection made by the customer via an input device;
   retrieving, from the POS server via a network interface, information about a plurality of requirements for accepting a return of the commodity using a commodity code assigned to the commodity, the requirements including:
- a first requirement that requires the commodity remain unopened, and
- a second requirement that requires a weight of the commodity fall within a range predetermined for the commodity;

determining whether each of the first and second requirements is met based on the captured image and the measured weight; and determining to initiate a refund process for the commodity if both the first and second requirements are met, and to not initiate the refund process if one of the first and second requirements is not met.

11. The method according to claim 10, further comprising showing on the display a screen that notifies the customer that the return of the commodity is not allowed when one of the first and second requirements is not met.

12. The method according to claim 11, wherein performing a predetermined calling process for calling a store clerk in response to an input made by the customer on the screen.

13. The method according to claim 12, wherein transmitting a notification to a terminal operated by the store clerk when performing the predetermined calling process.

14. The method according to claim 10, wherein the requirements include a third requirement that requires the current date fall within a first period that allows the commodity to be returned and that is set by a retail store,
the method further comprises:
- acquiring a current date, and
- determining whether the third requirement is met based on the acquired current date, and the refund process is determined to be initiated if all of the first, second, and third requirements are met, and not initiated if one of the first, second, and third requirements is not met.

15. The method according to claim 14, wherein the requirements include a fourth requirement that requires the current date fall within a period that allows the commodity to be returned and that is set for the commodity,
the method further comprises determining whether the fourth requirement is not met based on the acquired current date, and
the refund process is determined to be initiated if all of the first, second, third, and fourth requirements are met, and not initiated if one of the first, second, third, and fourth requirements is not met.

16. The method according to claim 10, wherein the retrieving further comprises retrieving the requirements from the POS server using the commodity code of the commodity presented by the customer, read by the scanner.

17. The method according to claim 10, further comprising:
during the refund process, transmitting an amount of refund to a checkout terminal via a network connected to the POS server.

18. A non-transitory computer readable medium storing a program causing a computer to execute a method of performing a returning process of a commodity, the method comprising:
reading with a scanner a customer ID that identifies a customer;
showing on a display a list of transactions made by the identified customer;
determining a commodity to be returned included in one of the transactions in response to a selection made by the customer via an input device;
retrieving, from the POS server via a network interface, information about a plurality of requirements for accepting a return of the commodity using a commodity code assigned to the determined commodity, the requirements including:
- a first requirement in which the commodity remains unopened, and
- a second requirement in which a weight of the commodity falls within a range predetermined for the commodity;

determining whether each of the first or the second requirements is met based on the captured image and the measured weight; and determining to initiate a refund process for the commodity if both the first and second requirements are met, and to not initiate the refund process if one of the first and second requirements is not met.

* * * * *